United States Patent [19]

DeLima

[11] Patent Number: 4,684,350

[45] Date of Patent: Aug. 4, 1987

[54] WAVE-PROPELLED MARINE VESSEL

[76] Inventor: Daniel D. DeLima, 26 Coblentz Ave., Cascade, Port-of-Spain, Trinidad, Trinidad and Tobago

[21] Appl. No.: 892,593

[22] Filed: Jul. 31, 1986

[51] Int. Cl.[4] .............................................. B63H 19/02
[52] U.S. Cl. ........................................................ 440/9
[58] Field of Search ......................... 440/9, 10, 13–17; 60/497–506

[56] References Cited

U.S. PATENT DOCUMENTS

| | | | |
|---|---|---|---|
| 2,996,034 | 8/1961 | Jonsson | 440/9 |
| 3,312,186 | 4/1967 | Litsheim | 440/9 |
| 3,453,981 | 7/1968 | Gause | 440/9 |
| 3,872,819 | 3/1975 | Pickens | 440/9 |

Primary Examiner—Joseph F. Peters, Jr.
Assistant Examiner—Jesús D. Sotelo
Attorney, Agent, or Firm—Kirschstein, Kirschstein, Ottinger & Israel

[57] ABSTRACT

A wave-propelled marine vessel is advanced by rising and falling water currents acting on pivotable fins located on submerged outer fin assemblies, and on other fins on a submerged central fin assembly. The outer fin assemblies are adjustably positioned to be integral wave lengths apart to maximize forward propulsion efficiency.

9 Claims, 4 Drawing Figures

WAVE-PROPELLED MARINE VESSEL

BACKGROUND OF THE INVENTION

1. Field of the Invention

This invention generally relates to a wave-propelled marine vessel and, more particularly, to a vessel which is advanced along an intended forward direction by the direct conversion of rising and falling water currents of a wave.

2. Description of Related Art

It has previously been proposed to utilize kinetic energy contained in sea waves to propel a ship. Generally speaking, the up-and-down motion of wave currents near the water-air interface is harnessed to generate a forward thrust having a horizontal component in order to forwardly propel the ship.

In some cases, this conversion of the wave kinetic energy is indirect. More specifically, the up-and-down motion of the water currents moves a floating body up and down, and this movement of the floating body is employed, for example, to rotate a propeller shaft to drive a turbine or an air compressor. These indirect conversion arrangements call for complex and elaborate machinery and, in any event, do not efficiently harness the kinetic energy contained in the waves.

Of greater promise, because of their greater efficiency, are arrangements which seek to convert the kinetic energy contained in the waves directly to a forward thrust having a horizontal component. These direct conversion arrangements utilize fins pivotable about respective axes situated forwardly of the center of hydrodynamic resistance of the vessel. The rising and falling water currents act on the pivotable fins to orient them in such a way that these currents are deflected generally rearwardly of the fins, thereby forwardly propelling the vessel.

Although generally satisfactory for their intended purpose, the known direct conversion arrangements have not proven to be altogether efficient in forwardly propelling a vessel. The horizontally-directed forward propulsion force that could have been efficiently harnessed from the water currents was limited by the mass, weight, buoyancy and inertia of the vessel itself. If the ratio of the driving force of the wave to the resisting force, e.g. mass, of the vessel became too large, then the vessel would move together with the driving force. This tended to decrease the velocity of the water currents deflected rearwardly of the vessel and, in turn, also decreased the speed of the vessel.

Exemplificative of prior art wave-propelled vessels are the following patents:
U.S. 1,448,029
U.S. 1,532,459
U.S. 1,705,430
U.S. 3,872,819
U.K. 190,867
U.K. 377,851
U.K. 914,997
U.K. 2,045,708
France 393,899
France 627,201
France 657,539
France 810,834
France 2,408,517
France 2,553,373
Belgium 570,555
Belgium 745,202
Japan 58-30893
Germany 189,767
Germany 189,768
Germany 27 40 939
Germany DE 3129819
Germany DE 3303535
PCT Internat'l WO 80/01674

SUMMARY OF THE INVENTION

1. Objects of the Invention

It is a general object of this invention to overcome the aforementioned drawbacks inherent in prior wave propulsion arrangements.

It is another object of this invention to provide a highly efficient direct conversion arrangement for forwardly propelling a vessel by wave energy without being limited by the mass, weight, buoyancy or inertia of the vessel itself.

Still another object of this invention is to maximize the efficiency of the forward propulsion arrangement at every speed and phase of sea waves by continuously adjusting the distance through which the fins are pivoted.

Yet another object of this invention is to adjust the position of the fins to correspond with the length of a given wave to further maximize efficiency.

A further object of this invention is to provide a highly efficient wave-propelled marine vessel of great versatility.

2. Features of the Invention

In keeping with these objects, and others which will become apparent hereinafter, one feature of this invention resides, briefly stated, in a wave-propelled marine vessel which is advanced by rising and falling water currents of a wave along an intended forward direction in a highly efficient manner. The vessel comprises an above-water superstructure having a main axis. A pair of submerged outer fin assemblies are operatively connected to the superstructure, and extend along longitudinal axes lying generally parallel to, and at opposite sides of, the main axis. A submerged central fin assembly is also operatively connected to the superstructure, and is located between the outer fin assemblies. The central fin assembly has a longitudinal axis extending generally parallel to the longitudinal axes of the outer fin assemblies.

In further accordance with this invention, each fin assembly has at least two fins mutually arranged in mirror-symmetrical relationship relative to its respective longitudinal axis. The fins of each assembly are movable in different circumferential directions in response to either rising or falling water currents about respective fin axes which extend radially of the respective longitudinal axis and downwardly away from the superstructure.

The outer fin assemblies are positioned so that their longitudinal axes are on the order of integral wave lengths of a wave transversely apart from each other. The fins on the outer fin assemblies substantially simultaneously move in one circumferential direction in response to rising water currents, and in an opposite circumferential direction in response to falling water currents. The central fin assembly is positioned so that its longitudinal axis is on the order of a half-wave length of the wave transversely away from the longitudinal axes of the outer fin assemblies. The fins on the central fin assembly substantially simultaneously move in said opposite circumferential direction in response to rising water currents, and in said one circumferential direction in response to falling water currents.

It is further advantageous when the fins of the outer fin assemblies have a combined surface area which is exposed to the water currents which is substantially equal to the combined surface area of the fins of the central fin assembly. In this way, the fins of the outer fin assemblies work in balanced reaction to the fins of the central fin assembly to propel the vessel along the forward direction.

The cooperation between the fins of the central fin assembly and the fins of the outer fin assemblies provides for a direct conversion of the kinetic energy contained in the sea wave to a forward thrust having a horizontal component of high magnitude. No longer is the magnitude of the forward thrust limited by the mass, weight, buoyancy or inertia of the vessel itself. The positioning of the outer fin assemblies to be integral wave lengths apart, and the concomitant positioning of the central fin assembly to be a half-wave length apart, results in a highly efficient forward propulsion which, in effect, is "fine-tuned" to the length of a wave in a given sea. This fine-tuning can be periodically adjusted to provide for different sea conditions.

Yet another feature of this invention is embodied in providing a longitudinally-extending body for each fin assembly, and providing a support for connecting each body to the superstructure at an attachment region which is located forwardly of the geometric center of the body. With this construction, it is advantageous if each fin assembly includes a first pair of front fins at a forward end region of the body, a second pair of rear fins at a rearward end region of the body, and a third pair of working fins at the attachment regions preferably located approximately one-third of the total length of the body rearwardly of the forward end region thereof. The rear trailing portions of each body located rearwardly of the attachment regions between the support and the body are composed of a resiliently stiff material such that they are free to rotate circumferentially about the respective longitudinal axis of the associated fin assembly during forward advancement of the vessel. The rear trailing portions of the bodies of the outer fin assemblies rotate in one direction, while the rear trailing portion of the body of the central fin assembly simultaneously rotates in the opposite direction.

Still another advantageous feature of this invention is embodied in means for constantly urging each fin to a predetermined position in which a leading edge of each fin faces forwardly. A torsion bar is advantageously connected to each fin to be certain that the latter returns to the predetermined position after the fin has been moved due to the aforementioned rising and falling water currents.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
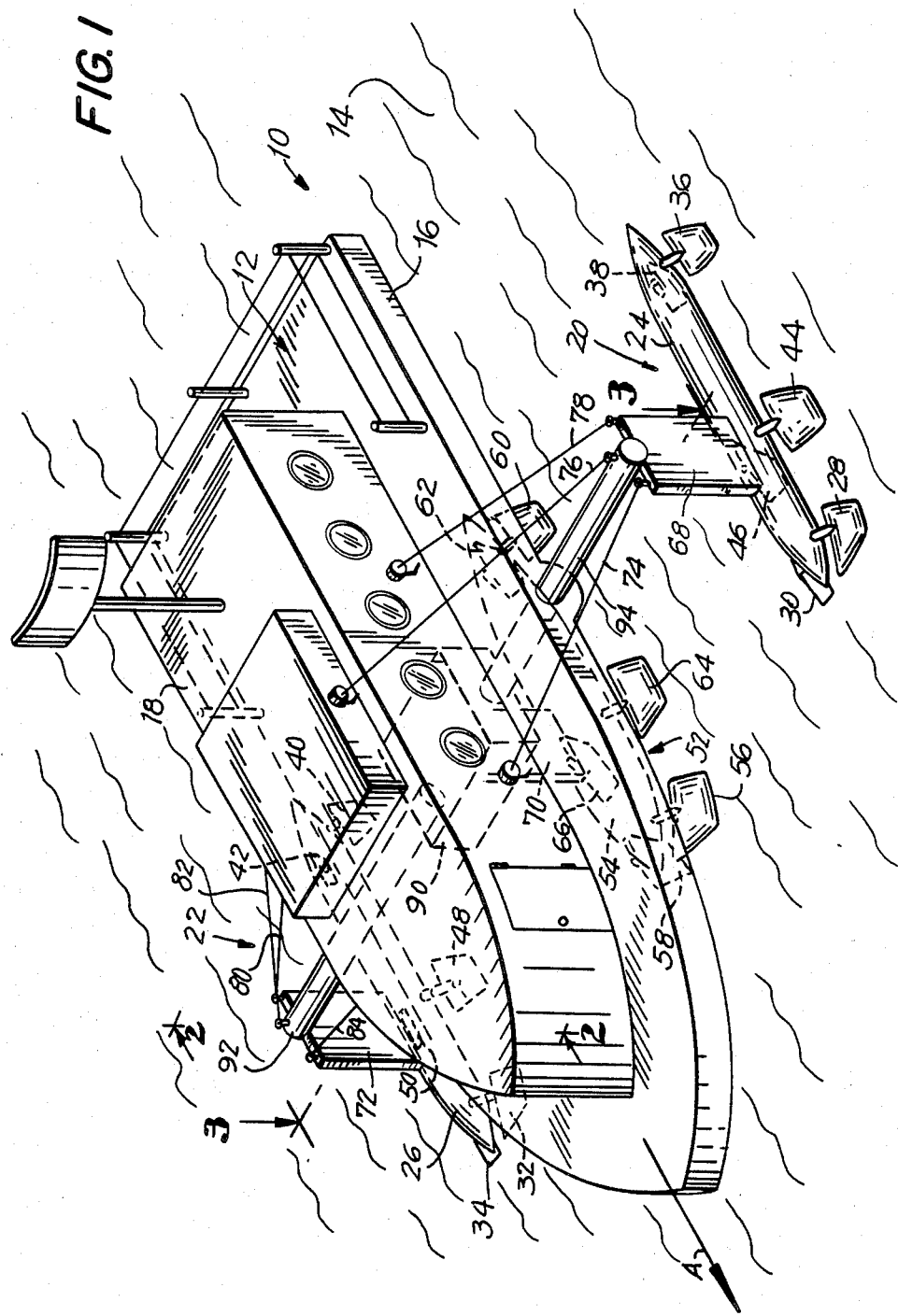
FIG. 1 is a front perspective view of a wave-propelled marine vessel in accordance with this invention.

Referring now to the drawings and, more particularly, to FIG. 1, the reference numeral 10 generally identifies a wave-propelled marine vessel which is advanced by rising and falling water currents, as described below, along an intended forward direction generally denoted by arrow A. The vessel 10 includes an above-water superstructure 12 located above water-air interface 14. The superstructure 12 includes a platform 16 and suitable cabin and cargo structures 18 mounted on the platform 16. Details of structures 18 are not necessary for an understanding of this invention, and virtually any structure conventionally found on ships could be employed. The vessel 10 has a main axis extending lengthwise along the forward direction A.

In accordance with this invention, a pair of outrigger-type outer fin assemblies 20, 22 are located at opposite sides of the vessel 10, and are symmetrically arranged relative to the main axis thereof. The outer fin assemblies 20, 22 have identical, submerged, generally cigar-shaped, streamlined bodies 24, 26 extending along respective longitudinal axes lying generally parallel to, and at opposite sides of, the main vessel axis. The outer fin assemblies respectively have a first pair of front fins 28, 30; 32, 34, at forward end regions or noses of the bodies 24, 26, a second pair of rear fins 36, 38; 40, 42, at rear end regions or tails of the bodies 24, 26, and a third pair of working fins 44, 46; 48, 50, at intermediate attachment regions of the bodies 24, 26. These intermediate attachment regions are not located at the geometrical centers of the bodies, but, instead, are located forwardly thereof. By way of non-limiting example, the attachment regions are located about one-third of the total length of the bodies rearwardly of their noses.

A central fin assembly 52 is located directly below the superstructure 12 midway between the outer fin assemblies. The central assembly 52 includes a submerged, cigar-shaped, streamlined body 54 extending along a longitudinal axis which also lies parallel to the longitudinal axes of the outer fin assemblies. The central assembly 52 has a pair of front fins 56, 58 at forward end regions of the body 54, a pair of rear fins 60, 62 at rear end regions of the body 54, and a pair of working fins 64, 66 at intermediate attachment regions of the body 54, the attachment regions being located about one-third of the total length of the body away from the forward end region thereof.

Figure 3:
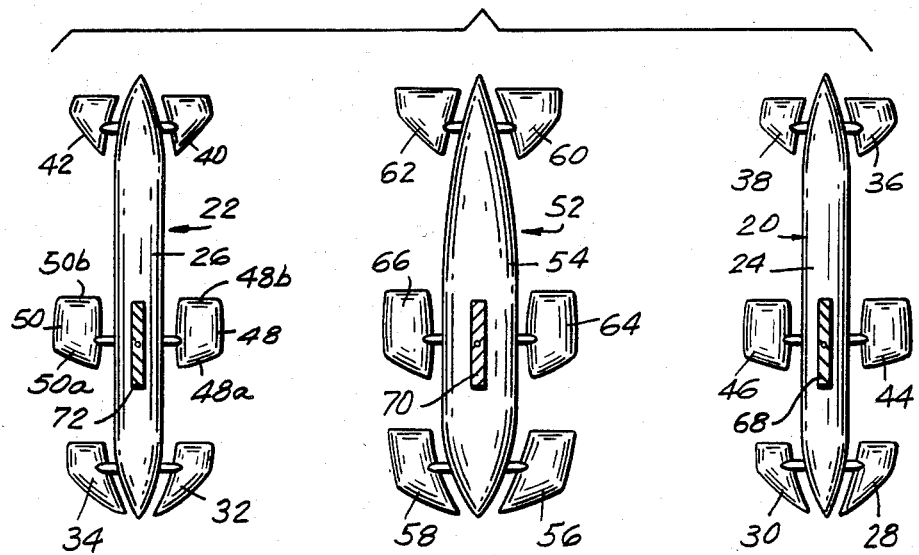
FIG. 3 is a top plan view on slightly reduced scale taken on line 3—3 of FIG. 1.

It will be noted, particularly with reference to FIG. 3, that each fin assembly is mirror-symmetrical about its respective longitudinal axis. The longitudinal axis of the central fin assembly and the main axis of the vessel lie in a common vertical plane. The longitudinal axes of both outer fin assemblies lie in laterally-offset parallel vertical planes.

Each fin assembly is supported in its respective vertical plane by upright supports 68, 70, 72 whose respective lower ends are attached at the attachment regions to bodies 24, 54 and 26, respectively. The upper ends of the supports extend out of the water, and are attached to the superstructure 12 by means of a first set of stays 74, 76, 78 at one side of the superstructure, and a second set of stays 80, 82, 84 provided at the other side of the superstructure. Each stay is tensioned by a winch for the purpose of rigidifying and steadying the uprights 68, 72 and, in turn, the bodies 24, 26 to which they are respectively attached.

The portions of the bodies 24, 26 which are located rearwardly of the supports 68, 72 are subjected to forces of high magnitude and, as described below, these trailing end portions are free to flex and rotate in circumferential directions about the respective longitudinal axes of the bodies.

Figure 2:
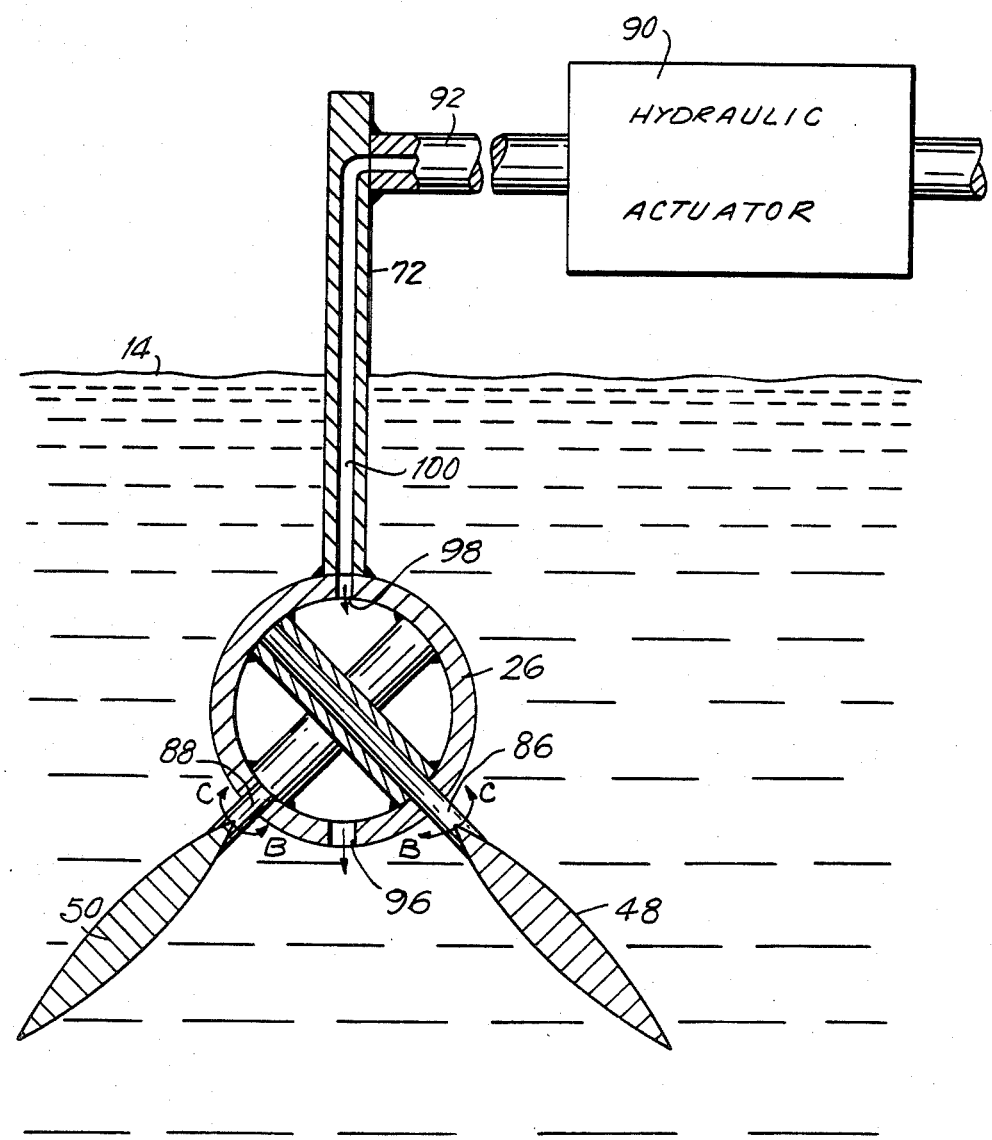
FIG. 2 is an enlarged sectional view taken on line 2—2 of FIG. 1.

Each fin is mounted on a respective fin assembly for movement in different circumferential directions in response to either rising or falling water currents about a respective fin axis. Each fin has a generally planar shape, with a leading linear edge and a trailing linear edge as considered in the forward direction A. As best shown in FIG. 2, for representative pair of working fins 48, 50 on body 26, these fins normally lie in planes which include a right angle with each other. The fins have shafts 86, 88 which extend along the aforementioned fin axes which extend radially of the longitudinal axis of the body 26. The fin axes also extend downwardly away from the superstructure, and diverge outwardly away from each other in the downward direction. Depending upon whether the water currents are rising or falling the fins 48, 50 will simultaneously move either in the direction of arrows B or in the direction of arrows C in FIG. 2.

The fins 48, 50 are normally positioned in, and tensioned to assume, a predetermined orientation in which the leading edges of the fins face directly forwardly. The shafts 86, 88 are preferably formed as torsion bars to constantly maintain the fins in said predetermined orientation, as shown in FIG. 2. The shafts 86, 88 do not pass through the geometrical center of their respective fins, but, instead, are located at an offset of about one-third the total length of the fin rearwardly of its leading edge. Thus, as best shown in FIG. 3, representative fins 48, 50 have forward portions 48a, 50a, and rearward portions 48b, 50b.

Figure 4:
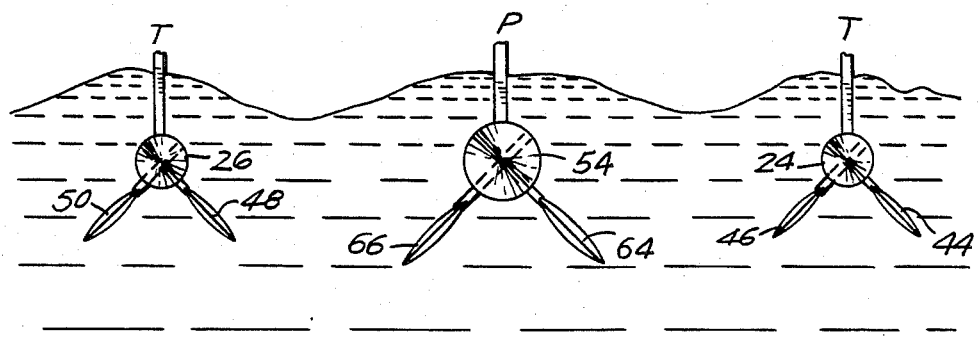
FIG. 4 is a schematic view illustrating the operation of the vessel of FIG. 1.
Figure 4:
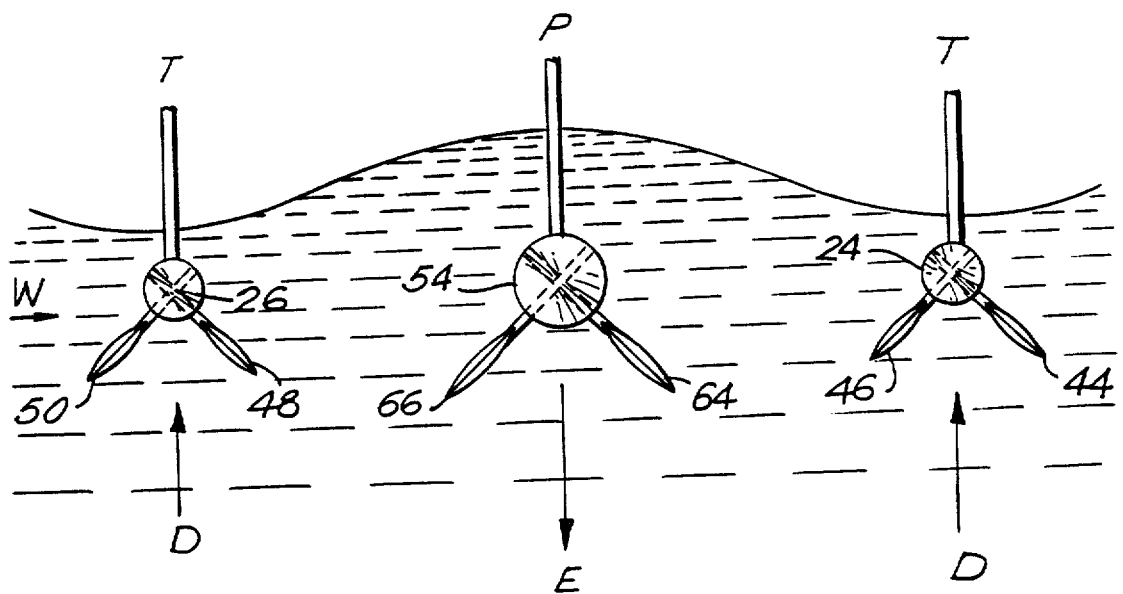

In the event of rising water currents, as schematically illustrated by arrows D in FIG. 4, the rear portions 48b, 50b of representative fins 48, 50 tilt up toward the water-air interface 14 against the constant force of the torsion bars and, concomitantly, the forward portions 48a, 50a tilt down to assume a so-called pigeon-toed orientation in which the leading edges of the fins are closer together than in said predetermined orientation, and in which the trailing edges of the fins are further apart. In this pigeon-toed orientation, when the rising water currents impinge on the undersides of the fins 48, 50, such currents are deflected rearwardly, thereby producing a propulsion force having a forward horizontal resultant component which pushes the vessel forward.

In the event of falling water currents, as schematically illustrated by arrow E in FIG. 4, the rear portions 48b, 50b of representative fins 48, 50 tilt down away from the superstructure against the constant force of the torsion bars and, concomitantly, the forward portions 48a, 50a of the fins 48, 50 tilt up to assume a so-called splayfoot orientation in which the leading edges of the fins are further apart than in said predetermined orientation, and in which the trailing edges are closer together. In this splayfoot orientation, when the falling water currents impinge on the upper sides of the fins, such currents are deflected rearwardly, thereby again producing a propulsion force having a forward horizontal component to further push the vessel forward.

In operation, the three pairs of fins on the outer assembly 20 all tilt up or down at the same time, as described above in connection with representative fins 48, 50. In order to maximize the efficiency of the forward propulsion, the three pairs of fins on the outer assembly 22 should also tilt up or down at the same time as the fins on the outer assembly 20. This is advantageously accomplished by adjustably positioning the outer fin assemblies 20, 22 to be whole wave lengths of a wave apart. Thus, as shown in FIG. 4, for a representative wave W having troughs T and peaks P, the outer fin assemblies are arranged at one or multiple wave lengths apart so that the fins on the outer assemblies will simultaneously be exposed to the same portions of the wave at any given instant of time. Thus, as shown in FIG. 4, the outer assemblies are simultaneously exposed to the troughs of the wave at a given moment, but not a trough and a peak at the same time.

To even further maximize propulsion efficiency, the central fin assembly should work in balanced reaction to the outer fin assemblies and, more specifically, the three pairs of fins on the central assembly should tilt down when the fins of the outer assemblies tilt up, and vice versa. This is advantageously accomplished by positioning the central fin assembly at one or more half-wave lengths apart. As shown in FIG. 4, the fins on the central assembly are exposed to a peak, while the fins on the outer assemblies are exposed to troughs of the wave.

It should further be noted that the fins of the outer assemblies have a combined surface area exposed to the water currents which is substantially equal to the combined surface area of the fins of the central fin assembly. This ensures a stable, straight course.

The adjustable positioning of the outer fin assemblies is preferably achieved by a hydraulic actuator 90 operatively connected to spanner booms 92, 94 connected to the supports 68, 72. The actuator 90 is operative to move the supports 68, 72 to the desired whole-wave-length position apart from each other.

It has been observed that water currents near the water-air interface travel in circular paths. Hence, during forward propulsion, the rear trailing portions of the bodies are subjected to water pressures which tend to rotate them about longitudinal axes. The rear trailing portions of the bodies are advantageously made of a resiliently stiff material to yield to these forces. The rear trailing portions of the bodies of the outer fin assemblies rotate in one circumferential direction, while the rear trailing portion of the body of the central fin assembly rotates in the opposite circumferential direction.

In order to ensure that the submerged bodies stay below water, the center of each body is made hollow, and a source of pressurized gas is admitted into the interior of each body. As shown in FIG. 2, each body has a port 96 through which water may enter into the interior of the body to decrease the buoyancy thereof, and another port 98 through which the pressurized gas may enter to expel water from within the body to the exterior thereof, thereby increasing the buoyancy thereof. The pressurized gas may be admitted along conduit 100 routed through the upright supports.

It will be expressly understood that the vessel is forwardly propelled not only by waves traveling in a transverse direction which intersects the main vessel axis, but also by waves traveling parallel to the main axis. Indeed, waves traveling in any direction can be used for propulsion.

It should be remembered that the above described movement of the fins was described, for the sake of simplicity, only with respect to rising and falling water currents. However, a wave also has transversely-directed water currents whose horizontal and vertical components depend about the location of the fins relative to the wave phase, which is usually sinusoidal. As noted above, a molecule of water near the air-water interface travels in a circular path. When a wave passes the molecule, the molecule describes a circle whose diameter is more or less equal to the amplitude of the wave. The water currents existing at the molecule will have a large horizontal component in the direction of the wave and a small downward component at a wave peak, and a small horizontal component in the opposite wave direction and a small upward component at a wave trough. In those portions of the wave between adjacent peaks and troughs, the wave will have larger vertical components which are utilized, as described previously, together with the horizontal components, to propel the vessel.

It will be understood that each of the elements described above, or two or more together, also may find a useful application in other types of constructions differing from the types described above.

While the invention has been illustrated and described as embodied in a wave-propelled marine vessel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A wave-propelled marine vessel advanced by rising and falling water currents along an intended forward direction, comprising:
   (a) an above-water superstructure having a main axis;
   (b) a pair of submerged outer fin assemblies operatively connected to the superstructure and extending along longitudinal axes generally parallel to, and at opposite sides of, the main axis;
   (c) a submerged central fin assembly operatively connected to the superstructure between the outer fin assemblies and having a longitudinal axis extending generally parallel to the longitudinal axes of the outer fin assemblies;
   (d) each fin assembly having at least two fins mutually arranged in mirror-symmetrical relationship to its respective longitudinal axis;
   (e) the fins of each assembly being movable in different circumferential directions in response to rising and falling water currents about respective fin axes which extend radially of the respective longitudinal axis and downwardly away from the superstructure;
   (f) means for positioning the outer fin assemblies so that their longitudinal axes are on the order of integral wave lengths of a wave transversely apart from each other, whereby the fins on the outer fin assemblies substantially simultaneously move in one circumferential direction in response to rising water currents, and in an opposite circumferential direction in response to falling water currents;
   (g) means for positioning the central fin assembly so that its longitudinal axis is on the order of a half-wave length of the wave transversely away from the longitudinal axes of the outer fin assemblies, whereby the fins on the central fin assembly substantially simultaneously move in said opposite circumferential direction in response to rising water currents, and in said one circumferential direction in response to falling water currents; and
   (h) the fins of the outer fin assemblies having a combined surface area exposed to the water currents which is substantially equal to the combined surface area of the fins of the central fin assembly, whereupon the fins of the outer fin assemblies work in balanced reaction to the fins of the central fin assembly to propel the vessel along the forward direction.

2. The marine vessel as recited in claim 1, wherein each fin assembly includes a longitudinally-extending body having a geometrical center, and a support for connecting each body to the superstructure, the support being attached forwardly of the geometrical center of the body.

3. The marine vessel as recited in claim 2, wherein each fin assembly has a first pair of front fins at a forward end region of the body, a second pair of rear fins at a rearward end region of the body, and a third pair of working fins at the region of attachment of the support to the body.

4. The marine vessel as recited in claim 2, wherein each support includes an upright member having a lower submerged end attached to a respective body, and an upper above-water end, and a set of stays spanning between each upper end and the superstructure.

5. The marine vessel as recited in claim 4, wherein each body is composed of a resiliently stiff material, and has a rear trailing portion located rearwardly of the region of attachment of the respective support to the body, said rear trailing portion being free to rotate circumferentially about the respective longitudinal axis of the associated fin assembly during forward advancement of the vessel, the rear trailing portions of the bodies of the outer fin assemblies rotating in one direction while the rear trailing portion of the body of the central fin assembly simultaneously rotates in an opposite direction.

6. The marine vessel as recited in claim 1, wherein the means for positioning the outer fin assemblies includes means for adjustably positioning the outer fin assemblies transversely apart from each other.

7. The marine vessel as recited in claim 1, wherein each fin has a generally planar shape and a leading edge, and wherein each fin assembly includes means for constantly urging each fin to a predetermined position in which each leading edge faces forwardly in the forward direction.

8. The marine vessel as recited in claim 7, wherein the two fins of each fin assembly include a right angle in the predetermined position.

9. The marine vessel as recited in claim 7, wherein the urging means includes a torsion bar connected to each fin and operative to return the respective fin to the predetermined position after movement due to the rising and falling water currents.

* * * * *

UNITED STATES PATENT AND TRADEMARK OFFICE
CERTIFICATE OF CORRECTION

PATENT NO. : 4,684,350  Page 1 of 2

DATED : Aug. 4, 1987

INVENTOR(S) : Daniel D. DeLima

It is certified that error appears in the above-identified patent and that said Letters Patent are hereby corrected as shown below:

Cancel original FIG. 4 of the patent, and replace with the new FIG. 4 attached hereto.

Signed and Sealed this

Seventeenth Day of May, 1988

Attest:

DONALD J. QUIGG

Attesting Officer

Commissioner of Patents and Trademarks